US011486604B2

(12) United States Patent
Wilson (10) Patent No.: US 11,486,604 B2
(45) Date of Patent: Nov. 1, 2022

(54) FURNACE FOR A ROOFTOP UNIT (71) Applicant: Johnson Controls Technology Company, Auburn Hills, MI (US)

(72) Inventor: Stephen C. Wilson, Norman, OK (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 315 days.

(21) Appl. No.: 16/709,657

(22) Filed: Dec. 10, 2019

(65) Prior Publication Data
US 2020/0116391 A1 Apr. 16, 2020

Related U.S. Application Data

(63) Continuation of application No. 15/660,768, filed on Jul. 26, 2017, now Pat. No. 10,502,454.
(Continued)

(51) Int. Cl.
*F24H 9/18* (2022.01)
*F28F 27/00* (2006.01)
(Continued)

(52) U.S. Cl.
CPC ............... *F24H 9/18* (2013.01); *F24H 8/006* (2013.01); *F28F 1/42* (2013.01); *F28F 13/06* (2013.01);
(Continued)

(58) Field of Classification Search
CPC .......... F24H 8/006; F24H 9/2085; F24H 9/18; F24H 3/087; F24H 2210/00; F24D 2220/042; F24D 5/02; F24D 5/04; F24D 19/0095; F23J 2213/70; Y02B 30/106; Y02B 30/00; F28F 1/42; F28F 13/06; F28F 17/005; F28F 27/006
(Continued)

(56) References Cited

U.S. PATENT DOCUMENTS 2,385,652 A  9/1945 Rifle
4,682,579 A  7/1987 Bigham
(Continued)

FOREIGN PATENT DOCUMENTS

AU  2015202604 A1 * 1/2016 ............... F24D 5/02
GB  2113366 A * 8/1983 ............. F23D 14/68

*Primary Examiner* — Steven B McAllister
*Assistant Examiner* — Daniel E. Namay
(74) *Attorney, Agent, or Firm* — Fletcher Yoder, P.C.

(57) ABSTRACT

A heating, ventilating, and air conditioning (HVAC) system includes a furnace having a primary heat exchanger and a secondary heat exchanger, where the primary heat exchanger and the secondary heat exchanger form a heat exchange relationship between an airflow and an exhaust gas, and where the primary heat exchanger is positioned upstream of the secondary heat exchanger, a burner configured to generate the exhaust gas, a sensor configured to monitor an ambient temperature, and a control system configured to receive feedback from the sensor, compare the feedback to a threshold, operate the furnace in a first mode when the ambient temperature exceeds the threshold, and operate the furnace in a second mode when the ambient temperature is at or below the threshold, where the furnace operates above a condensation temperature when in the second mode, such that the exhaust gas does not condense when operating in the second mode.

19 Claims, 7 Drawing Sheets

Related U.S. Application Data (60) Provisional application No. 62/369,560, filed on Aug. 1, 2016.

(51) Int. Cl.
*F28F 13/06* (2006.01)
*F28F 1/42* (2006.01)
*F24H 8/00* (2022.01)
*F28F 17/00* (2006.01)

(52) U.S. Cl.
CPC .......... *F28F 17/005* (2013.01); *F28F 27/006* (2013.01); *F24D 2220/042* (2013.01); *F24H 2210/00* (2013.01); *Y02B 30/00* (2013.01)

(58) Field of Classification Search
USPC ............... 126/116 A, 110 R, 110 C, 112
See application file for complete search history.

(56) References Cited

U.S. PATENT DOCUMENTS

| | | |
|---|---|---|
| 5,024,595 A | 6/1991 | Schumacher et al. |
| 5,178,124 A * | 1/1993 | Lu .......................... F24H 8/00 165/170 |
| 6,089,221 A | 7/2000 | Mano et al. |
| 6,684,878 B2 | 2/2004 | Ho et al. |
| 7,494,337 B2 | 2/2009 | Specht et al. |
| 7,850,448 B2 | 12/2010 | Slaby |
| 8,206,147 B2 | 6/2012 | Videto et al. |
| 8,662,885 B2 | 3/2014 | Roland et al. |
| 2003/0070672 A1 | 4/2003 | Ho et al. |
| 2010/0122806 A1 | 5/2010 | Halgash |
| 2011/0192180 A1 | 8/2011 | Henderson et al. |
| 2012/0048257 A1 | 3/2012 | Reifel et al. |
| 2012/0048521 A1 | 3/2012 | Reifel et al. |
| 2012/0148963 A1 * | 6/2012 | Carey .................... F23D 14/08 165/157 |
| 2012/0192849 A1 | 8/2012 | Alphs |
| 2012/0279484 A1 | 11/2012 | Lange |
| 2013/0108971 A1 | 5/2013 | Maiello et al. |
| 2014/0116357 A1 | 5/2014 | Yano et al. |
| 2014/0352930 A1* | 12/2014 | Hanks .................. F28D 1/0477 165/173 |
| 2015/0354834 A1 | 12/2015 | Barone |
| 2016/0216004 A1 | 7/2016 | Bruton et al. |
| 2016/0216005 A1 | 7/2016 | Bruton et al. |
| 2016/0216006 A1 | 7/2016 | Bruton et al. |
| 2016/0281339 A1 | 9/2016 | Banks |
| 2018/0259199 A1* | 9/2018 | Batson .................. F23L 17/005 |
| 2018/0259223 A1 | 9/2018 | Reed et al. |

* cited by examiner

FURNACE FOR A ROOFTOP UNIT

CROSS REFERENCE TO RELATED APPLICATIONS

This application is a continuation of U.S. patent application Ser. No. 15/660,768, filed Jul. 26, 2017, entitled "FURNACE FOR A ROOFTOP UNIT," which claims priority from and the benefit of U.S. Provisional Patent Application No. 62/369,560, entitled "METHOD OF UTILIZING A FURNACE ON A ROOFTOP UNIT," filed Aug. 1, 2016, the disclosures of which are hereby incorporated by reference in their entireties for all purposes.

BACKGROUND

The present disclosure relates generally to environmental control systems, and more particularly, to a furnace for environmental control systems.

Environmental control systems are utilized in residential, commercial, and industrial environments to control environmental properties, such as temperature and humidity, for occupants of the respective environments. The environmental control system may control the environmental properties through control of an airflow delivered to the environment. For example, a heating, ventilating, and air conditioning (HVAC) system routes the airflow through a furnace having a heat exchanger prior to delivery to the environment. The heat exchanger transfers thermal energy from a fluid flowing through the heat exchanger to the airflow to increase a temperature of the airflow. In some cases, transferring the thermal energy from the fluid in the heat exchanger may result in condensation of the fluid in the heat exchanger. The condensed fluid is ultimately removed from the HVAC system via a drainage system. Unfortunately, when the ambient temperature is at or below 0° Celsius (C) (32° Fahrenheit (F)), the condensed fluid may solidify (e.g., freeze) within the drainage system, which may result in blockage of the drainage system, thereby affecting operation of the HVAC system.

SUMMARY

In one embodiment, a heating, ventilating, and air conditioning (HVAC) system includes a furnace having a primary heat exchanger and a secondary heat exchanger, where the primary heat exchanger and the secondary heat exchanger are configured to form a heat exchange relationship between an airflow through the furnace and an exhaust gas flowing through the primary heat exchanger and the secondary heat exchanger, and where the primary heat exchanger is positioned upstream of the secondary heat exchanger with respect to a flow of the exhaust gas, a burner of the furnace configured to generate the exhaust gas and direct the exhaust gas to the primary heat exchanger, a sensor configured to monitor an ambient temperature, and a control system configured to receive feedback from the sensor indicative of the ambient temperature, compare the feedback indicative of the ambient temperature to a temperature threshold, operate the furnace in a first operating mode when the ambient temperature exceeds the temperature threshold, and operate the furnace in a second operating mode when the ambient temperature is at or below the temperature threshold, where the furnace operates above a condensation temperature of the exhaust gas when in the second operating mode, such that the exhaust gas does not condense when the furnace operates in the second operating mode.

In another embodiment, one or more tangible, non-transitory machine-readable media having processor-executable instructions to receive feedback from a first sensor indicative of ambient temperature, compare the feedback indicative of the ambient temperature to a temperature threshold, operate a furnace of a heating, ventilating, and air conditioning (HVAC) system in a first operating mode when the ambient temperature exceeds the temperature threshold, and operate the furnace of the HVAC system in a second operating mode when the ambient temperature is at or below the temperature threshold, where the furnace operates above a condensation temperature of an exhaust gas when in the second operating mode, such that the exhaust gas does not condense when the furnace operates in the second operating mode.

In an another embodiment, a method includes receiving feedback from a sensor indicative of ambient temperature, comparing the feedback indicative of the ambient temperature to a temperature threshold, operating a furnace of a heating, ventilating, and air conditioning (HVAC) system in a first operating mode when the ambient temperature exceeds the temperature threshold, and operating the furnace of the HVAC system in a second operating mode when the ambient temperature is at or below the temperature threshold, where the furnace operates above a condensation temperature of an exhaust gas when in the second operating mode, such that the exhaust gas does not condense when the furnace operates in the second operating mode.

DETAILED DESCRIPTION

Embodiments of the present disclosure are directed toward a rooftop or other outdoor unit that includes a furnace of a heating, ventilating, and air conditioning (HVAC) system. As will be appreciated, condensate generated in the furnace of a rooftop or outdoor unit may freeze when outdoor temperatures are at or below approximately 0° C. (32° F.). For example, existing rooftop or outdoor units for HVAC systems include a heat exchanger that transfers heat from a fluid (e.g., an exhaust gas from a burner) flowing through tubes of the heat exchanger to an airflow in the furnace external to the tubes of the heat exchanger. As the fluid in the heat exchanger transfers thermal energy to the airflow, a temperature of the fluid is reduced. In some cases, the temperature of the fluid may decrease to a condensation point (e.g., a condensation temperature), such that a portion of the fluid condenses and forms a condensate that ultimately exits the furnace through a drain. As used herein, the condensation point and/or the condensation temperature is a temperature at which the fluid in the heat exchanger (e.g., exhaust gas) begins to condense from a vapor into a liquid (e.g., form liquid droplets). In other words, the condensation point and/or the condensation temperature is a temperature at which the fluid in the heat exchanger (e.g., exhaust gas) is substantially all vapor (e.g., above 90% by weight, above 95% by weight, or above 99% by weight vapor).

It is now recognized that including a secondary heat exchanger (e.g., a fin coil or other heat exchange device) in addition to a primary heat exchanger (e.g., an existing heat exchanger) may enhance an efficiency of the furnace. For example, a secondary heat exchanger may be positioned downstream of the primary heat exchanger with respect to a flow of the fluid from the burner. In some embodiments, the secondary heat exchanger includes relatively small tubes having fins, which increases an amount of heat transfer between the fluid and the airflow. As such, the furnace may achieve an efficiency of 90% or greater. As used herein, the efficiency of the furnace refers to an amount of thermal energy (e.g., heat) absorbed by the airflow through the furnace compared to an amount of thermal energy (e.g., heat) input to the furnace and used to increase the temperature of the fluid (e.g., based on an amount of fuel input to the burner). While increasing the amount of heat transfer between the fluid and the airflow may increase the efficiency of the furnace, increasing the amount of heat transfer between the fluid and the airflow may also increase an amount of condensate formed in the primary heat exchanger and/or the secondary heat exchanger (e.g., the temperature of fluid in the heat exchanger decreases in proportion to the amount of thermal energy transferred to the airflow).

To reduce and/or prevent condensation of the fluid in the heat exchanger (e.g., the primary heat exchanger and/or the secondary heat exchanger), a temperature of the fluid in the heat exchanger may be increased by increasing a fuel input to the burner of the furnace. For example, a flow rate of fuel, such as natural gas, and/or a flow rate of oxidant, such as air, to the burner may be increased to increase a temperature of the flame in the burner. As such, the temperature of the fluid flowing through the heat exchanger increases. In some cases, the temperature of the fluid may be sufficiently high that condensate does not form in the heat exchanger despite the transfer of thermal energy from the fluid to the airflow. Operation of the furnace at such increased temperatures may result in a reduced furnace efficiency, such as between 80% and 90%. A balance of fuel input to the burner and efficiency of the furnace may be adjusted, such that a total heat output of the furnace is substantially the same in either mode of operation (e.g., when ambient temperatures are at or below near freezing and when ambient temperatures are above near-freezing).

When the furnace produces condensate in the heat exchanger, the condensate is collected and drained using a drainage system of the rooftop or outdoor unit. The drainage system includes drainage pipes that direct the condensate to a drain for disposal of the condensate (e.g., to a sewer and/or another suitable destination). Portions of the drainage system are exposed to ambient conditions surrounding the rooftop or outdoor unit. When ambient conditions reach near-freezing temperatures (e.g., approximately 0° C.), the condensate may solidify, thereby blocking a flow of the condensate through the drainage pipe. Blockage of the drainage system may affect the overall operation of the HVAC system. Therefore, embodiments of the present disclosure are directed to a rooftop or outdoor unit having a furnace that is operated at a high efficiency mode when ambient temperatures are above a threshold temperature (e.g., above 2° C., above 3° C., above 4° C., or above 5° C.) and operated at a reduced efficiency mode when ambient temperatures are at or below the threshold temperature. Accordingly, the disclosed system may operate without, or substantially without, producing condensate when the ambient temperature is near freezing (e.g., by operating above a condensation temperature of the fluid in the heat exchanger), but maintain relatively high efficiency when the ambient temperature is above freezing. Thus, the disclosed embodiments of the rooftop or outdoor unit may mitigate problems associated with freezing of condensate in drainage pipes and other drainage system components.

Figure 1:
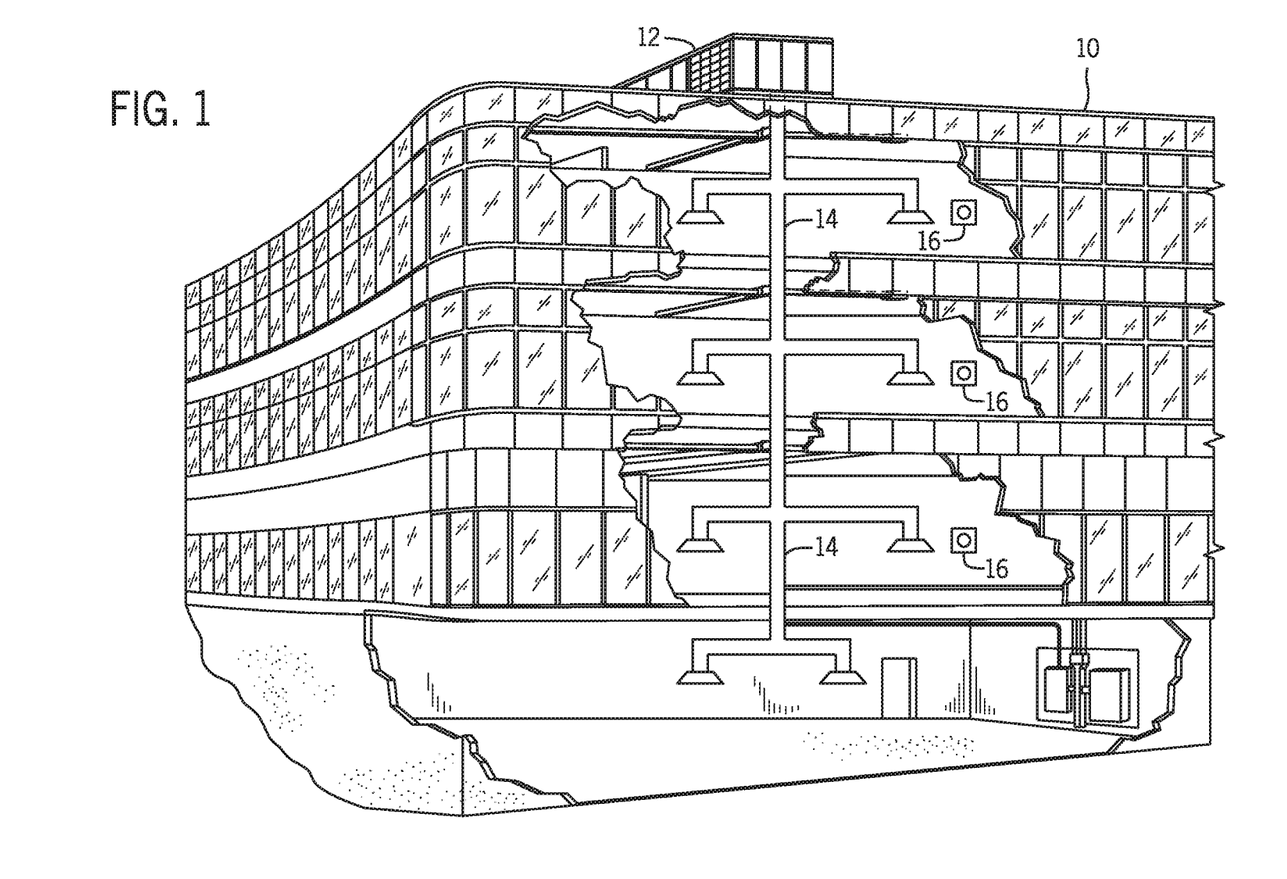
FIG. 1 is a schematic of an environmental control for building environmental management that may employ one or more HVAC units, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a reheat unit or a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
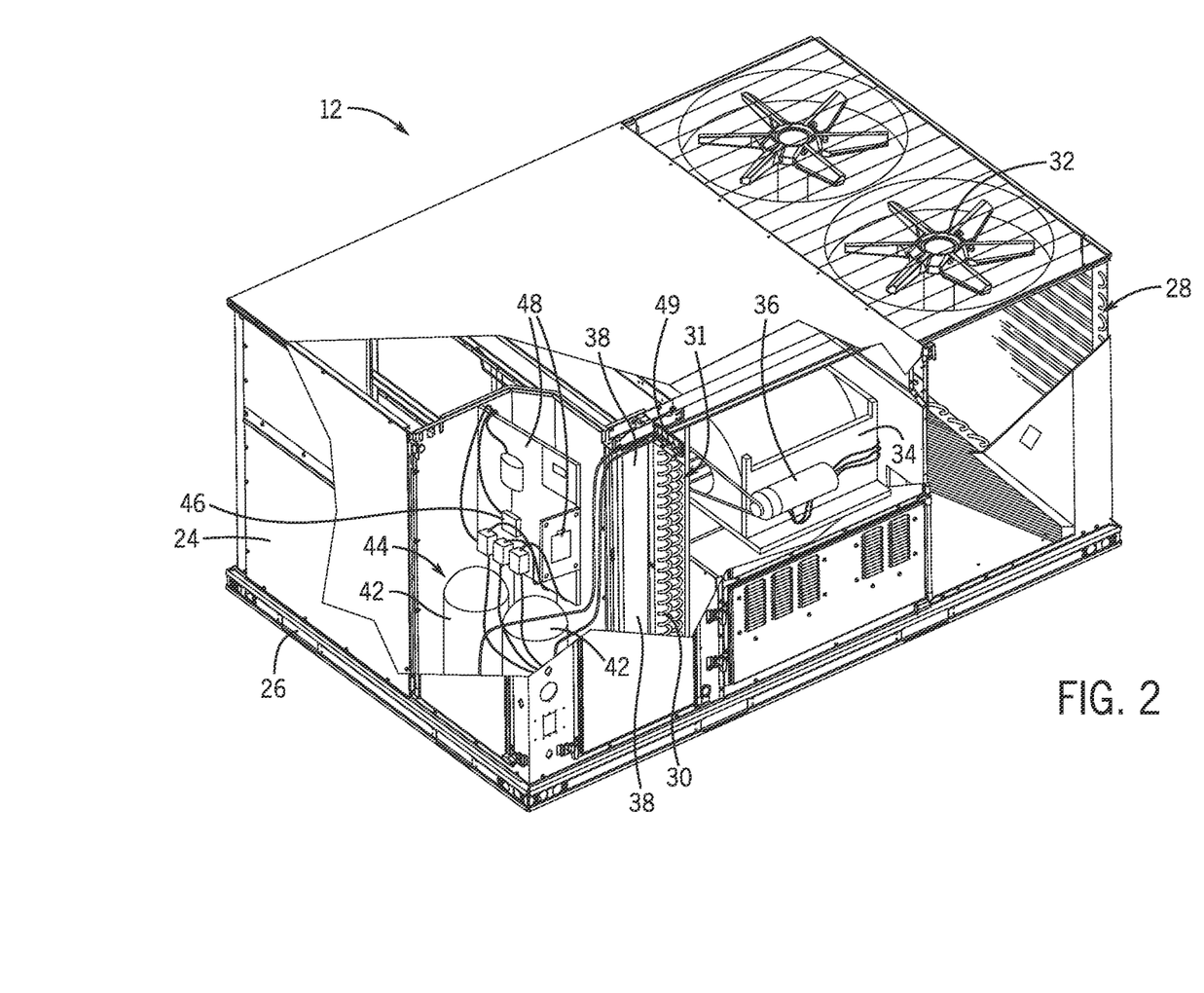
FIG. 2 is a perspective view of an embodiment of the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a molecular sieve type or solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
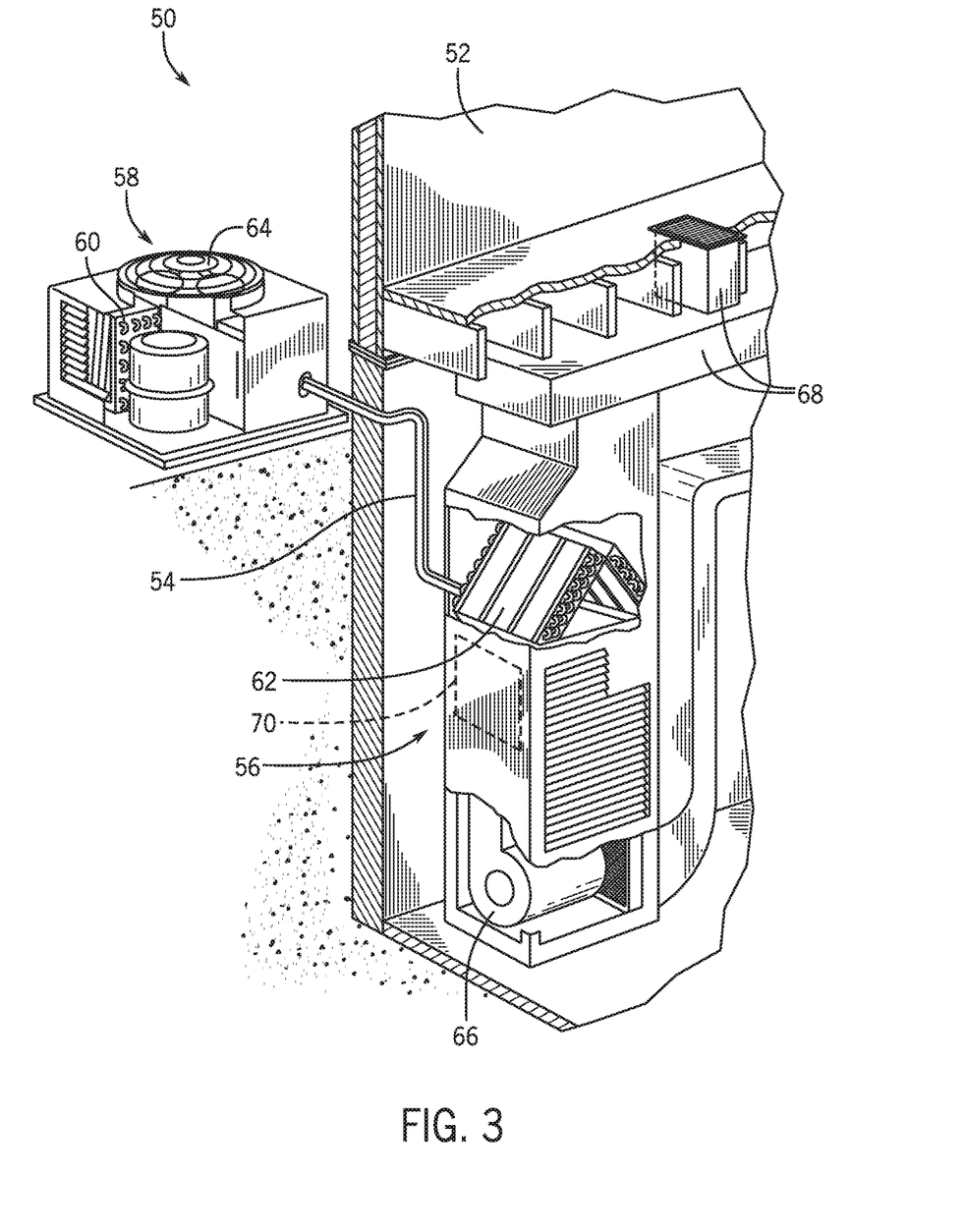
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
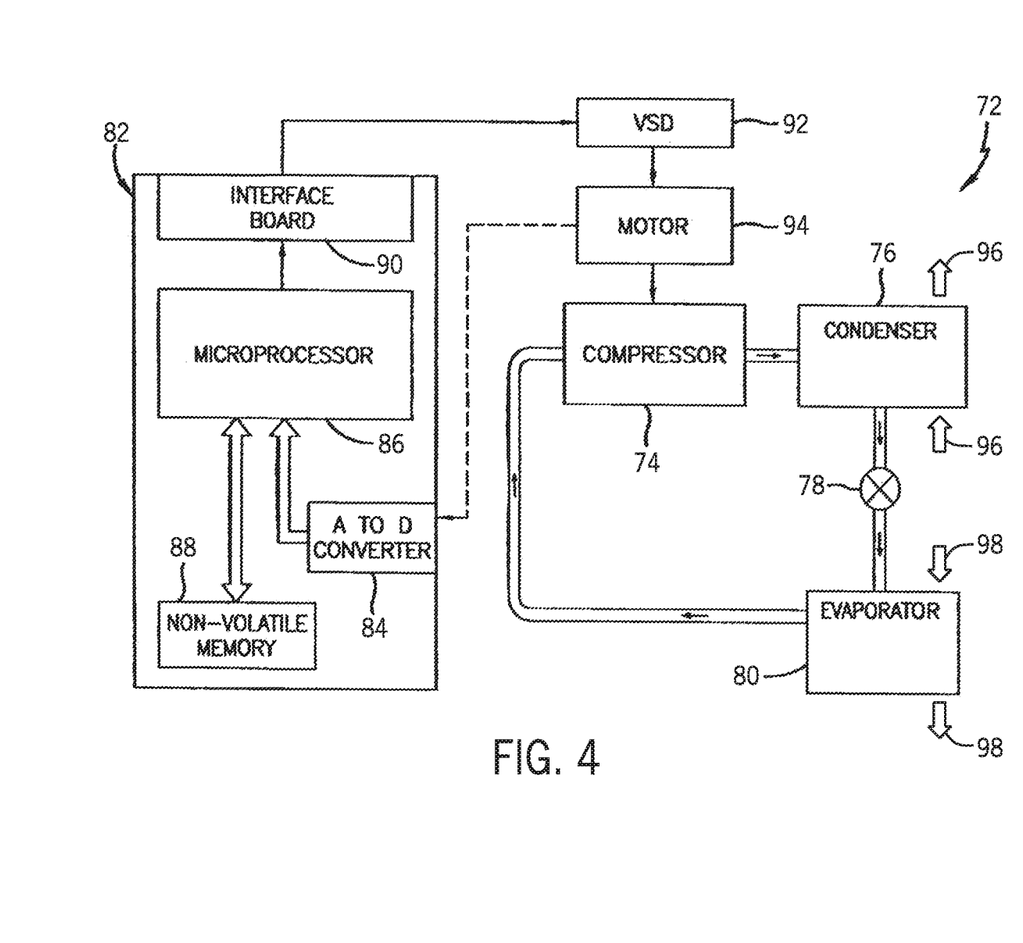
FIG. 4 is a schematic of an embodiment of a vapor compression system that can be used in any of the systems of FIGS. 1-3, in accordance with an aspect the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, present embodiments are directed to the HVAC unit 12 having a furnace that can generate condensate during operation. In some embodiments, the HVAC unit 12 includes a furnace having a secondary heat exchanger that transfers additional heat from combustion products, such as exhaust gas, to an airflow through the furnace to provide heat to the building 10. The secondary heat exchanger improves the efficiency of the furnace by increasing an amount of heat transfer between the combustion products and the airflow, which may result in condensation of a portion of the combustion products. As discussed in further detail below, the furnace may be operated at a high efficiency mode (e.g., a first mode) and produce condensate when ambient temperatures are above freezing. When the ambient temperature reaches near-freezing (e.g., between 0° C. and 5° C.), the furnace may switch to a reduced efficiency mode (e.g., a second mode) and produce insignificant amounts of condensate, such that freezing does not occur in a condensate drainage system of the furnace. When operating in the reduced efficiency mode, a flow rate of fuel and/or a flow rate oxidant to a burner of the furnace may be increased, which may increase a temperature of the combustion products and enable the furnace to operate above a condensation temperature of the combustion products. The increased temperature of the combustion products may enable the combustion products to transfer thermal energy to the airflow through the furnace without reducing the temperature of the combustion products below the condensation temperature. Thus, production of condensate may be substantially avoided when the furnace operates in the reduced efficiency mode, which may reduce and/or eliminate freezing and blockage of the condensate drainage system.

Figure 5:
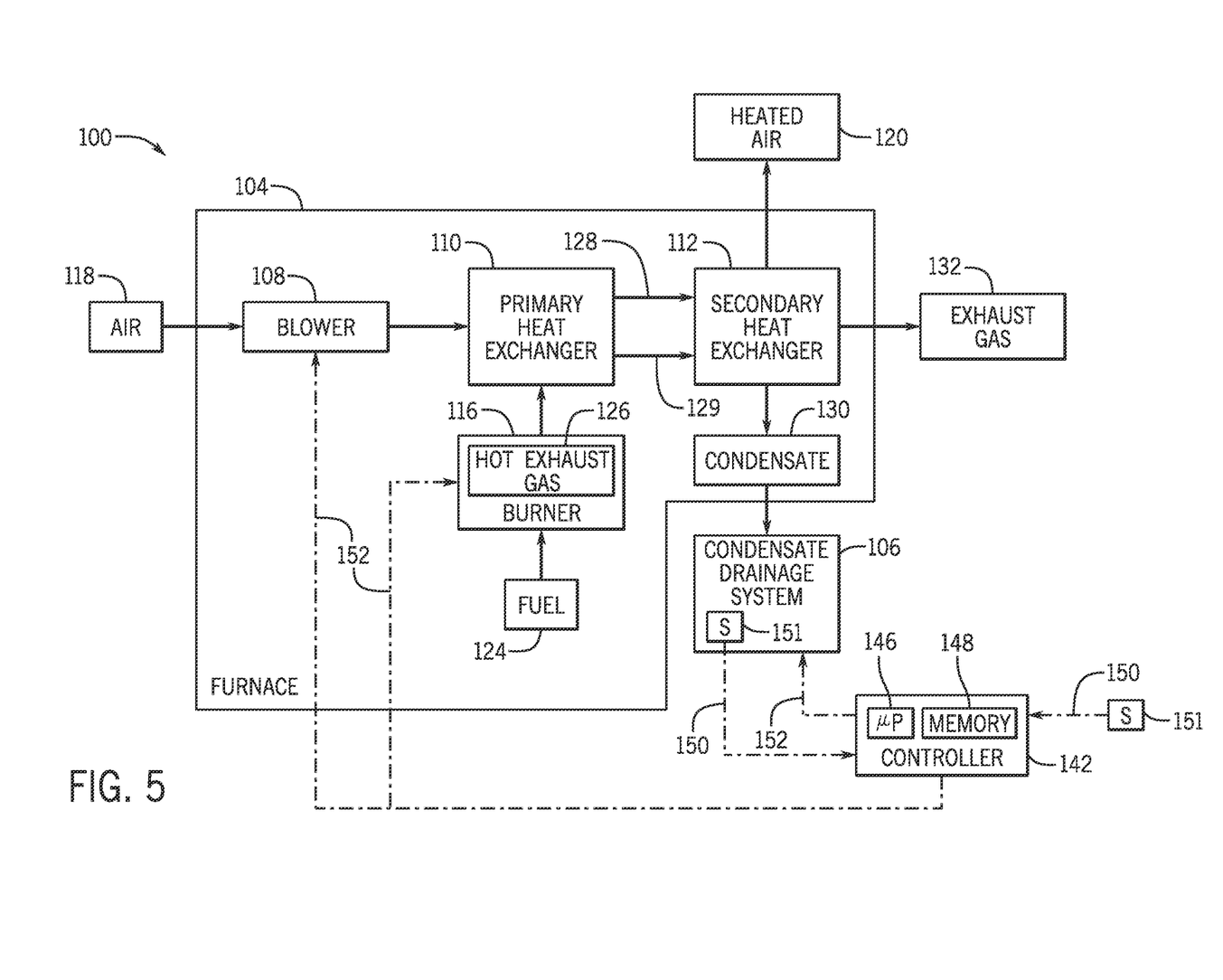
FIG. 5 is a schematic of an embodiment of a rooftop unit having a furnace that may operate in a high efficiency mode and a reduced efficiency mode, in accordance with an aspect of the present disclosure.

FIG. 5 is a block diagram of an embodiment of a rooftop or outdoor unit 100, which could be the HVAC unit 12 of FIG. 2, having a furnace 104 and a condensate drainage system 106 fluidly coupled to the furnace 104. The furnace 104 also includes a blower 108, a primary heat exchanger 110, a secondary heat exchanger 112, and a burner 116 that enable heating of air 118 that is ultimately used to heat the building 10 (see, e.g., FIG. 1). For example, in operation, the blower 108 draws the air 118 into the furnace 104. The air 118 is heated by the primary heat exchanger 110 and the secondary heat exchanger 112 within the furnace 104, and heated air 120 is released from the furnace 104 into an air distribution system of the building 10 (see, e.g., FIG. 1). The burner 116 receives and burns a fuel 124, such as natural gas, which generates a hot exhaust gas 126 that is delivered to the primary heat exchanger 110 and the secondary heat exchanger 112. The air 118 may pass over coils of the primary heat exchanger 110 and absorb thermal energy from the hot exhaust gas 126 flowing through the coils of the primary heat exchanger 110. Accordingly, a temperature of the hot exhaust gas 126 is reduced and a cooled hot exhaust gas 128 is directed from the primary heat exchanger 110 to the secondary heat exchanger 112. Additionally, a temperature of the air 118 increases thereby creating a heated air stream 129 that is directed from the primary heat exchanger 110 to the secondary heat exchanger 112. The heated air stream 129 then passes over coils of the secondary heat exchanger 112, where the heated air stream 129 absorbs thermal energy from the cooled hot exhaust gas 128 flowing through the coils of the secondary heat exchanger 112. A temperature of the heated air stream 129 further increases to generate the heated air 120, which is ultimately supplied to the air distribution system of the building 10 (see, e.g., FIG. 1).

The secondary heat exchanger 112 improves an efficiency of the furnace 104 by recovering additional heat from the cooled hot exhaust gas 128. In this way, the furnace 104 may operate at an efficiency of greater than 82%. That is, the furnace 104 recovers at least 82% of the thermal energy from the hot exhaust gas 126. The cooled hot exhaust gas 128 directed to the secondary heat exchanger 112 transfers thermal energy to the heated air stream 129, thereby reducing a temperature of the cooled hot exhaust gas 128. In the secondary heat exchanger 112, the cooled hot exhaust gas 128 may at least partially condense as a result of the reduced temperature and form a condensate 130 and an exhaust gas 132. In some embodiments, the exhaust gas 132 is released from the condensing furnace 104 via a vent. Additionally, the condensate 130 may exit the furnace 104 via the condensate drainage system 106.

As discussed above, the condensate drainage system 106 collects and drains condensate 130 generated in the furnace 104 using drainage pipes that feed the condensate 130 from the furnace 104 to a drain. The drainage pipes may be exposed to ambient temperatures, which may fall below 0° C. and cause the condensate 130 to solidify (e.g., freeze), thereby blocking removal of the condensate 130 from the furnace 104. Accordingly, the HVAC unit 12 includes a controller 142 that controls operation of the furnace 104 to substantially prevent formation of condensate 130 when ambient temperatures fall below a first temperature threshold and/or controls operation of the furnace 104 to substantially prevent freezing of the condensate 130 when a temperature of the condensate 130 falls below a second threshold.

For example, the controller 142 may adjust flow control devices (e.g., valves, pumps, blowers) to control fluid flow between different system components. The controller 142 may include a distributed control system (DCS) or any computer-based control system that is fully or partially automated. For example, the controller 142 may be any device employing a general purpose or an application-specific processor 146 and memory circuitry 148 storing instructions related to temperature and condensate control. The memory circuitry 148 may store the first temperature threshold of ambient air, the second temperature threshold of the condensate 130, and/or a pressure threshold of the condensate 130 in the condensate drainage system 106. In addition, the memory circuitry 148 may include instructions and algorithms for controlling the components of the HVAC unit 12 based on input signals 150 from one or more sensors 151. For example, the rooftop or outdoor unit 100 may include sensors 151 disposed external to the cabinet 24 of the HVAC unit 12, which monitor the ambient temperature. Additionally, the rooftop or outdoor unit 100 may include sensors 151 within the condensate drainage system 106 that monitor the temperature of any condensate 130 present in the condensate drainage system 106. The instructions may include activating and/or adjusting one or more components of the HVAC unit 12 based on the feedback from the one or more sensors 151 (e.g., feedback indicative of ambient air temperature, the condensate temperature, a condensate pressure, and/or levels of the condensate 130 within the condensate drainage system 106). For example, the controller 142 may transmit an output signal 152 to components of the furnace 104, such as the blower 108, a valve controlling a flow rate of the fuel 124, and/or the burner 116, to control operation of the furnace 104. As discussed in detail below, the controller 142 may increase a flow of the fuel 124 to the burner 116 when feedback from the sensor 151 monitoring ambient temperature indicates that ambient temperature is below a threshold (e.g., between 0° C. and 5° C.). The processor 146 may include one or more processing devices, and the memory circuitry 148 may include one or more tangible, non-transitory, machine-readable media collectively storing instructions executable by the processor 146 to perform the methods and control actions described herein.

The machine-readable media can be any available media other than signals that can be accessed by the processor 146 or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 146 or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions includes, for example, instructions and data which cause the processor 146 or any general purpose computer, special purpose computer, or special purpose processing machine to perform a certain function or group of functions, such as measuring the temperature of the condensate 130 and the pressure within the condensate drainage system 106.

Figure 6:
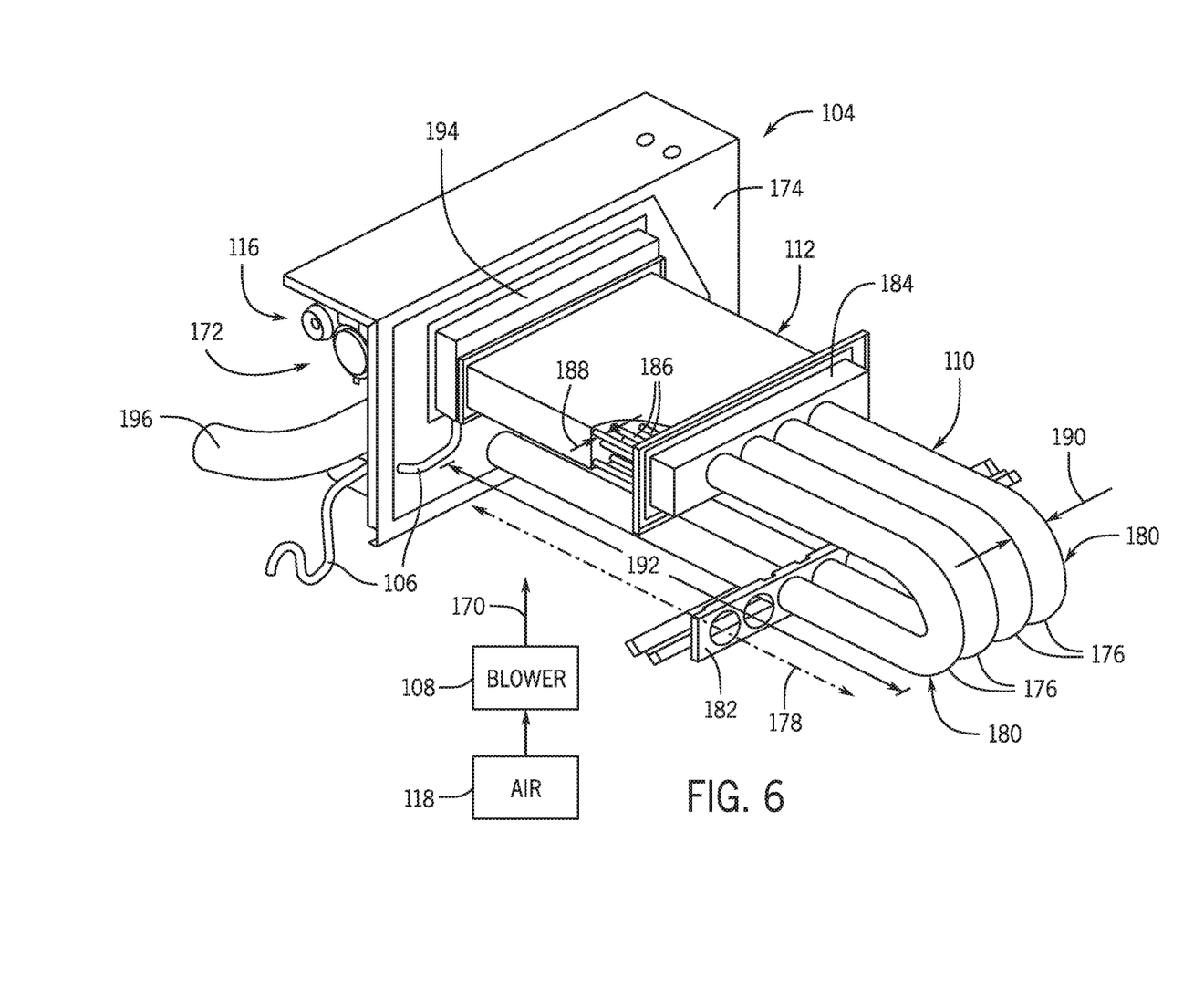
FIG. 6 is a perspective view of an embodiment of the furnace of FIG. 5, in accordance with an aspect of the present disclosure.

As discussed above, embodiments of the present disclosure are directed to the operating the furnace 104 in a high efficiency mode when ambient temperatures exceed freezing and operating the furnace 104 in a reduced efficiency mode when ambient temperatures are near-freezing. To achieve the high efficiency mode, such as an efficiency above 82%, the furnace 104 may include the primary heat exchanger 110 and the secondary heat exchanger 112. FIG. 6 is a perspective view of an embodiment of the furnace 104 having the primary heat exchanger 110 and the secondary heat exchanger 112. As shown in the illustrated embodiment of FIG. 6, the primary heat exchanger 110 and the secondary heat exchanger 112 are disposed in an airflow path 170 that is isolated from a burner compartment 172 by a barrier 174. The barrier 174 may guide the air 118 to flow over coils of the primary heat exchanger 110 and the secondary heat exchanger 112 without flowing over and/or through other components of the furnace 104. As such, the barrier 174 may enhance an amount of thermal energy transfer between the air 118 and the hot exhaust gas 126 by blocking the air 118 from bypassing the primary heat exchanger 110 and the secondary heat exchanger 112.

As discussed above, the air 118 may be directed along the airflow path 170 by the blower 108. In some cases, including the secondary heat exchanger 112 in the furnace 104 may increase a resistance and/or a pressure drop of the air 118 flowing through the furnace 104 because of the additional surface area over which the air 118 flows. As such, a power input to the blower 108 may increase to account for the increased resistance. In certain embodiments, a capacity of the blower 108 is increased to address the additional resistance and/or pressure drop experienced by the air 118 flowing through the furnace 104. As a non-limiting example, existing furnaces 104 have a blower that is 12 inches (in.) by 9 in. The furnace 104 of the present disclosure may include a blower 108 that is a 12 in. by 12 in. direct drive blower. Increasing the capacity of the blower 108 may enable the air 118 to flow through the furnace 104 with substantially the same flow rate as a furnace not having the secondary heat exchanger 112, while minimizing an amount of additional power input to the blower 108.

In some embodiments, the primary heat exchanger 110 may include tubes 176 that extend through the barrier 174 and into the burner 116, such that the tubes 176 receive the hot exhaust gas 126 from the burner 116. As shown in the illustrated embodiment of FIG. 6, the primary heat exchanger 110 includes four of the tubes 176. Each of the tubes 176 may be rated to transfer a certain amount of energy between the exhaust gas 126 and the air 118. For example, each tube 176 may be rated between 0.5 kilowatts (kW) and 40 kW, between 1 kW and 30 kW, or between 2 kW and 15 kW. In other embodiments, each tube 176 may be rated between 10,000 British Thermal Units per hour (Btuh) and 50,000 Btuh. In other embodiments, the primary heat exchanger 110 may include less than four tubes 176 or more than four tubes 176. In still further embodiments, the primary heat exchanger 110 includes any suitable number of the tubes 176 that enable sufficient thermal energy transfer to the air 118, while reducing a pressure drop of the exhaust gas 126 through the primary heat exchanger 110. As shown in the illustrated embodiment of FIG. 6, the tubes 176 of the primary heat exchanger 110 extend from the barrier 174 along an axis 178 and ultimately curve back toward the barrier 174 at bends 180 of the tubes 176. Further, the tubes 176 are supported by a support bracket 182, which may be coupled to one or more walls of the cabinet 24 of the HVAC unit 12, for example.

In any case, the tubes 176 of the primary heat exchanger 110 direct the cooled hot exhaust gas 128 into the secondary heat exchanger 112 at a first collector 184 (e.g., a first header). The cooled hot exhaust gas 128 accumulates in the first collector 184 and is directed into tubes 186 of the secondary heat exchanger 112 (e.g., a fin coil). The secondary heat exchanger 112 may be rated to transfer a certain amount of energy between the cooled hot exhaust gas 128 and the air 118. For example, the secondary heat exchanger 112 may be rated between 5 kilowatts (kW) and 150 kW, between 10 kW and 130 kW, or between 14 kW and 120 kW. In other embodiments, the secondary heat exchanger 112 may be rated between 50,000 British Thermal Units per hour (Btuh) and 400,000 Btuh. As shown in the illustrated embodiment of FIG. 6, the tubes 186 of the secondary heat exchanger 112 have a diameter 188 that is less than a diameter 190 of the tubes 176. In some embodiments, the diameter 188 of the tubes 186 is between one tenth and one half, between one tenth and one fourth, or between one twentieth and one tenth of the diameter 190 of the tubes 176. Directing the cooled hot exhaust gas 128 into the tubes 186 having the diameter 188 less than the diameter 190 of the tubes 176 increases a surface area for the air 118 to contact, and thus, enables the air 118 to absorb additional thermal energy from the cooled hot exhaust gas 128 via the tubes 186. The secondary heat exchanger 112 thus increases an efficiency of the furnace 104 by increasing an amount of thermal energy transfer between the air 118 and the cooled hot exhaust gas 128. As discussed above, the furnace 104 may achieve an efficiency above 82% as a result of the secondary heat exchanger 112.

The increased thermal energy transfer achieved by the secondary heat exchanger 112 enables a length 192 of the tubes 176 from the barrier 174 to the bends 180 to be reduced, which reduces an overall size or footprint of the furnace 104. For example, the length 192 of the tubes 176 may be reduced between 0.5 inches (in.) and 24 in., between 1 in. and 15 in., or between 5 in and 10 in. when compared to furnaces 104 that do not include the secondary heat exchanger 112.

The cooled hot exhaust gas 128 is directed through the secondary heat exchanger 112 toward a second collector 194 that couples the tubes 186 to an exhaust outlet 196 and/or the condensate drainage system 106. The exhaust gas 132 and/or the condensate 130 exiting the secondary heat exchanger 112 may accumulate in the second collector 194, such that the exhaust gas 132 exits the furnace 104 through the exhaust outlet 196 and the condensate 130 is drained from the furnace 104 through the condensate drainage system 106.

As discussed above, producing the condensate 130 when ambient temperatures are near freezing (e.g., between 0° C. and 5° C.) may cause the condensate 130 to freeze in the condensate drainage system 106 and block a flow of the condensate 130 from the second collector 194 out of the furnace 104. Accordingly, upon detection of ambient temperatures reaching a threshold temperature (e.g., 1° C., 2° C., 3° C., 4° C., or 5° C.), the controller 142 may adjust a flow of the fuel 124 and/or an oxidant (e.g., air) into the burner 116 to increase a fuel input to the burner 116 (e.g., to enable the furnace to operate above a condensation temperature of the hot exhaust gas 126 and/or the cooled hot exhaust gas 128). In some embodiments, the controller 142 may adjust the flow rate of the fuel 124 and the oxidant into the burner 116 to increase the fuel input, while maintaining a desired emission standard, such as less than 8.6 weight percent carbon dioxide in the exhaust gas 132. Increasing the fuel input to the burner 116, in turn, increases a temperature of the hot exhaust gas 126. The controller 142 may be configured to increase the temperature of the hot exhaust gas 126, such that the cooled hot exhaust gas 128 does not condense in the secondary heat exchanger 112 to produce the condensate 130. In other words, the temperature of the hot exhaust gas 126 may be increased to a sufficient temperature that sufficiently heats the air 118 without reducing the temperature of the cooled hot exhaust gas 128 below a condensation temperature. When operating at such conditions, the efficiency of the furnace 104 may be between 80% and 90%. Accordingly, the efficiency of the furnace 104 is reduced when the ambient temperature reaches near-freezing, but the furnace 104 still provides the heated air 120 at substantially (e.g., within 5% of or within 10% of) the same temperature as the heated air 120 produced when ambient temperatures are above freezing. A balance of fuel input to the burner and efficiency of the furnace may be adjusted, such that a total heat output of the furnace is substantially the same in either mode of operation (e.g., when ambient temperatures are at or below near freezing and when ambient temperatures are above near-freezing).

In some embodiments, the controller 142 is configured to adjust the flow rate of the fuel 124 and/or the oxidant into the burner 116 when a temperature of the condensate 130 falls below a second threshold temperature even when the ambient temperature is above a first threshold temperature (e.g., 1° C., 2° C., 3° C., 4° C., or 5° C.). For example, the sensor 151 configured to monitor the temperature of the condensate 130 in the condensate drainage system 106 may be utilized to verify an accuracy of the sensor 151 monitoring the ambient temperature. When the temperature of the condensate 130 falls below the second threshold, the condensate 130 may be near a freezing point. The controller 142 may then switch the furnace into the reduced efficiency mode to reduce and/or eliminate production of the condensate 130 to avoid freezing within the condensate drainage system 106.

Figure 7:
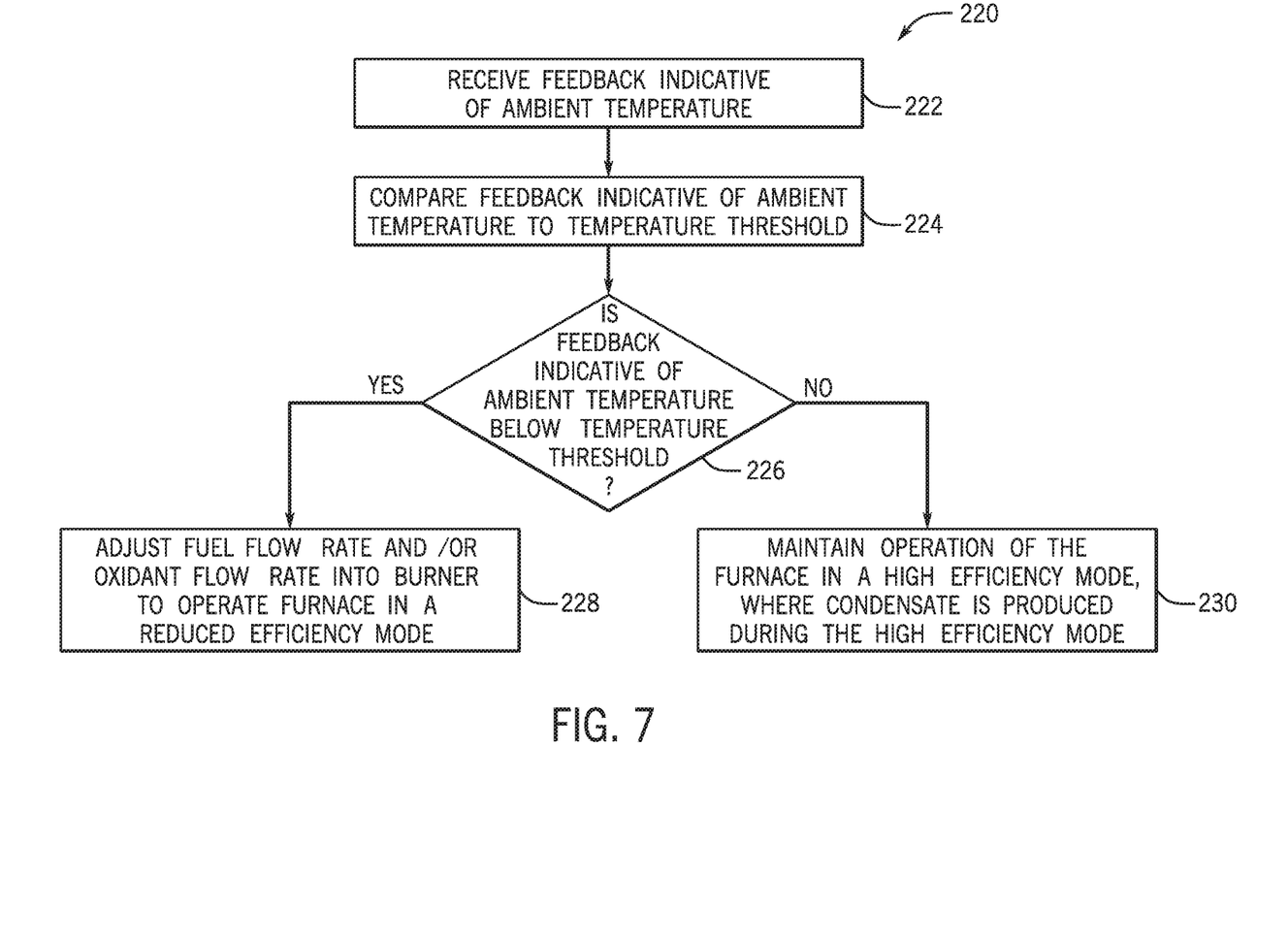
FIG. 7 is a block diagram of an embodiment of a process for operating the furnace of FIGS. 5 and 6, in accordance with an aspect of the present disclosure.

FIG. 7 is a flow chart of an embodiment of a process 220 that may be utilized to operate the furnace 104 in one of two operating modes based on ambient temperature (or a temperature of the condensate 130). For example, at block 222, the controller 142 receives feedback indicative of ambient temperature from the sensor 151. The sensor 151 is disposed external to the cabinet 24 of the HVAC unit 12 and monitors a temperature of ambient air. Accordingly, at block 224, the controller 142 compares the feedback from the sensor 151 to a temperature threshold. In some embodiments, the temperature threshold may be a temperature slightly above a freezing point of water. For example, the temperature threshold may be between 0° C. and 5° C., between 0.5° C. and 3° C., or between 1° C. and 2° C.

The controller 142 determines whether the feedback from the sensor 151 indicates that the ambient temperature is below the temperature threshold at block 226. When the feedback from the sensor 151 indicates that the ambient temperature is below the temperature threshold, the controller 142 adjusts the fuel flow rate and/or the oxidant flow rate into the burner 116 to increase the flame temperature of the burner 116, as shown in block 228. As discussed above, increasing the flame temperature of the burner 116 increases a temperature of the hot exhaust gas 126 and the cooled hot exhaust gas 128 that flow through the primary heat exchanger 110 and the secondary heat exchanger 112, respectively. As such, a temperature of the cooled hot exhaust gas 128 may be maintained above a condensation temperature despite the thermal energy that is transferred from the cooled hot exhaust gas 128 to the air 118 in the secondary heat exchanger 112. The furnace 104 thus operates in a reduced efficiency mode (e.g., an efficiency between 80% and 90%), but the condensate 130 is not produced, such that freezing does not occur in the condensate drainage system 106.

At block 230, the controller 142 maintains operation of, or operates, the furnace 104 in a high efficiency mode (e.g., an efficiency above 90%) when the feedback from the sensor 151 indicates that the ambient temperature is above the threshold temperature. The furnace 104 may thus produce the condensate 130 without the condensate freezing in the condensate drainage system 106 and operate at a relatively high efficiency (e.g., above 90%). As discussed above, the controller 142 may also receive feedback from the sensor 151 monitoring the temperature of the condensate 130. When the temperature of the condensate 130 falls below a second threshold (e.g., 1° C., 2° C., 3° C., 4° C., or 5° C.), the controller 142 may adjust the flow rate of the fuel and/or the flow rate of the oxidant to the burner 116 to operate the furnace 104 in the reduced efficiency mode to avoid freezing of the condensate 130 in the condensate drainage system 106.

As set forth above, the furnace 104 of the present disclosure may provide one or more technical effects useful in the operation of HVAC systems to prevent condensate from freezing in a condensate drainage system. For example, embodiments of the present approach may operate the furnace 104 in a high efficiency mode when ambient temperatures are above a threshold temperature (e.g., a temperature above a freezing point of water). Additionally, operation of the furnace 104 may switch to a reduced efficiency mode when the ambient temperature falls below the threshold temperature, such that the furnace 104 does not produce condensate. Operation of the furnace 104 during both the high efficiency mode and the reduced efficiency mode may provide substantially the same amount of heating to an airflow through the furnace 104, such that heat input to a building remains constant between the two operating modes. Further, the furnace 104 includes a secondary heat exchanger that may enhance an efficiency of the furnace 104 by increasing thermal energy transfer between exhaust gases and the airflow through the furnace 104. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A furnace of a heating, ventilation, and air conditioning (HVAC) system, comprising:
   a burner configured to generate a heating fluid;
   a primary heat exchanger configured to receive the heating fluid from the burner and place the heating fluid in a heat exchange relationship with an air flow directed through an air flow path of the furnace, wherein the primary heat exchanger comprises a first number of first heat exchange tubes, wherein at least a portion of the first heat exchange tubes extends along an axis;
   a secondary heat exchanger configured to receive the heating fluid from the primary heat exchanger and place the heating fluid in an additional heat exchange relationship with the air flow directed through the air flow path of the furnace, wherein the secondary heat exchanger comprises a second number of second heat exchange tubes that is greater than the first number, wherein the second heat exchange tubes extend along the axis; and
   a collector fluidly coupled to the primary heat exchanger and the secondary heat exchanger, wherein the collector is disposed between the first heat exchange tubes and the second heat exchange tubes along the axis to fluidly couple the first heat exchange tubes to the second heat exchange tubes, such that the first heat exchange tubes are coupled to the collector at a first side of the collector, and the second heat exchange tubes are coupled to the collector at a second side of the collector opposite the first side.

2. The furnace of claim 1, wherein the secondary heat exchanger is positioned downstream of the primary heat exchanger relative to a flow direction of the air flow through the air flow path.

3. The furnace of claim 1, wherein a first diameter of each first heat exchange tube is greater than a second diameter of each second heat exchange tube.

4. The furnace of claim 3, wherein the first diameter of each first heat exchange tube is at least twice as great as the second diameter of each second heat exchange tube.

5. The furnace of claim 1, wherein each first heat exchange tube of the primary heat exchanger comprises a bend, and each second heat exchange tube of the secondary heat exchanger is linear.

6. The furnace of claim 1, comprising an additional collector fluidly coupled to the secondary heat exchanger, wherein the additional collector is configured to receive the heating fluid from the secondary heat exchanger.

7. The furnace of claim 6, comprising an exhaust outlet fluidly coupled to the additional collector and configured to discharge the heating fluid from the furnace.

8. The furnace of claim 7, wherein the additional collector is configured to collect condensate generated by the furnace, and wherein the furnace comprises a condensate drain port fluidly coupled to the additional collector and configured to discharge condensate collected by the additional collector from the furnace.

9. The furnace of claim 6, comprising a barrier configured to separate the air flow path from a burner compartment of the furnace, wherein the burner is disposed within the burner compartment, the first heat exchange tubes are coupled to the barrier, and the additional collector is coupled to the barrier.

10. A furnace of a heating, ventilation, and air conditioning (HVAC) system, comprising:
    a burner configured to generate a heating fluid;
    a primary heat exchanger positioned within an air flow path of the furnace and configured to receive the heating fluid from the burner and place the heating fluid in a heat exchange relationship with an air flow directed through the air flow path, wherein the primary heat exchanger comprises first tubes, each first tube having a first diameter, wherein at least a portion of the first tubes extends along an axis;
    a secondary heat exchanger positioned within the air flow path and configured to receive the heating fluid from the primary heat exchanger and place the heating fluid in an additional heat exchange relationship with the air flow directed through the air flow path, wherein the secondary heat exchanger comprises second tubes, each second tube having a second diameter, wherein the first diameter is greater than the second diameter, and wherein the second tubes extend along the axis; and
    a collector disposed between the first tubes and the second tubes along the axis to fluidly couple the first tubes to the second tubes, such that the collector is coupled to the first tubes at a first side of the collector and coupled to the second tubes at a second side of the collector opposite the first side.

11. The furnace of claim 10, wherein the secondary heat exchanger is positioned within the air flow path downstream of the primary heat exchanger relative to a flow direction of the air flow through the furnace.

12. The furnace of claim 10, wherein the collector is configured to direct the heating fluid from the first tubes to the second tubes.

13. The furnace of claim 12, wherein the collector is a first collector, and the furnace comprises an exhaust outlet and a second collector fluidly coupled between the secondary heat exchanger and the exhaust outlet, wherein the second collector is configured to direct the heating fluid from the second tubes to the exhaust outlet.

14. The furnace of claim 13, comprising a condensate drain port fluidly coupled to the second collector, wherein the second collector is configured to collect condensate generated from the heating fluid, and the condensate drain port is configured to discharge the condensate from the second collector.

15. The furnace of claim 10, wherein a first number of the first tubes is less than a second number of the second tubes.

16. A furnace of a heating, ventilation, and air conditioning (HVAC) system, comprising:
- an air flow path configured to direct an airflow therethrough;
- a first plurality of heat exchanger tubes disposed within the air flow path and configured to direct a heating fluid therethrough, wherein at least a portion of the first plurality of heat exchanger tubes extends along an axis;
- a first collector disposed within the airflow path, wherein a first side of the first collector is coupled to the first plurality of heat exchanger tubes and is configured to receive the heating fluid from the first plurality of heat exchanger tubes;
- a second plurality of heat exchanger tubes disposed within the air flow path, wherein the second plurality of heat exchanger tubes extends along the axis, wherein the second plurality of heat exchanger tubes is coupled to a second side of the first collector opposite the first side, is configured to receive the heating fluid from the first collector, and is configured to direct the heating fluid therethrough, wherein the first collector is disposed between the first plurality of heat exchanger tubes and the second plurality of heat exchanger tubes along the axis to fluidly couple the first plurality of heat exchanger tubes to the second plurality of heat exchanger tubes;
- a second collector coupled to the second plurality of heat exchanger tubes, wherein the second collector is configured to receive the heating fluid from the second plurality of heat exchanger tubes;
- an exhaust outlet coupled to the second collector and configured to discharge the heating fluid from the furnace; and
- a condensate drain port coupled to the second collector, wherein the condensate drain port is configured to discharge condensate formed from the heating fluid and collected in the second collector from the furnace.

17. The furnace of claim 16, wherein each heat exchanger tube of the first plurality of heat exchanger tubes comprises a first diameter, each heat exchanger tube of the second plurality of heat exchanger tubes comprises a second diameter, and the first diameter is greater than the second diameter.

18. The furnace of claim 16, wherein the second plurality of heat exchanger tubes is positioned downstream of the first plurality of heat exchanger tubes relative to a flow direction of the air flow through the air flow path.

19. The furnace of claim 16, wherein the first plurality of heat exchanger tubes comprises a first number of tubes, the second plurality of heat exchanger tubes comprises a second number of tubes, and the first number is less than the second number.

* * * * *